United States Patent [19]

Kenworthy

[11] Patent Number: 4,485,630
[45] Date of Patent: Dec. 4, 1984

[54] COMBUSTOR LINER

[75] Inventor: Milton J. Kenworthy, Cincinnati, Ohio

[73] Assignee: General Electric Company, Cincinnati, Ohio

[21] Appl. No.: 447,836

[22] Filed: Dec. 8, 1982

[51] Int. Cl.³ ............................ F02G 3/00; F02G 1/00
[52] U.S. Cl. ..................................... 60/757; 60/39.32
[58] Field of Search ...................... 60/39.32, 752, 753, 60/755, 757; 415/136, 12

[56] References Cited

U.S. PATENT DOCUMENTS

| | | | |
|---|---|---|---|
| 2,962,256 | 11/1960 | Bishop | 415/136 |
| 3,397,732 | 8/1968 | Howell, Jr. | 164/46 |
| 3,845,620 | 11/1974 | Kenworthy | 60/757 |
| 3,854,843 | 12/1974 | Penny | 416/241 B |
| 3,982,850 | 9/1976 | Jenkinson | 60/39.32 |
| 3,995,422 | 12/1976 | Stamm | 60/757 |
| 4,050,241 | 9/1977 | DuBell | 60/757 |
| 4,050,843 | 9/1977 | Needham et al. | 415/136 |
| 4,259,842 | 4/1981 | Koshoffer et al. | 60/757 |
| 4,329,848 | 5/1982 | Caruel et al. | 60/757 |
| 4,354,687 | 10/1982 | Holland et al. | 415/136 |

FOREIGN PATENT DOCUMENTS

| | | |
|---|---|---|
| 722121 | 1/1955 | United Kingdom . |
| 1274489 | 5/1972 | United Kingdom . |
| 1545783 | 5/1979 | United Kingdom . |
| 2061483 | 10/1979 | United Kingdom . |

Primary Examiner—Louis J. Casaregola
Assistant Examiner—Timothy S. Thorpe
Attorney, Agent, or Firm—Francis L. Conte; Douglas S. Foote; Derek P. Lawrence

[57] ABSTRACT

A combustor liner for use between a cooling fluid and hot combustion gases is disclosed. The combustor liner includes portions having different thermal coefficients of expansion so that portions subject to relatively high temperatures have relatively low coefficients of expansion and portions subject to relatively low temperatures have relatively high coefficients of expansion. In this manner, differential thermal expansion is reduced, thereby reducing thermally induced stresses and distortions.

10 Claims, 8 Drawing Figures

COMBUSTOR LINER

BACKGROUND OF THE INVENTION

This invention relates generally to combustors and, more particularly, to means effective for reducing thermally induced stresses therein.

Increased performance levels of gas turbine engines can be obtained by increasing the operating temperatures thereof. In so doing, the combustors of these gas turbine engines are exposed to extremely high temperatures and large variations in temperatures during engine operation. In order to withstand these relatively high and fluctuating temperatures, new alloys have been developed which have improved material characteristics.

Furthermore, improved combustor cooling structures and techniques have been developed for reducing the temperatures experienced by the combustor. For example, one type of combustor includes a plurality of annular liner segments which define an outer boundary for constraining relatively hot combustion gases. These liner segments are joined by annular cooling nuggets, or junctions, which receive relatively cool, compressor discharge air and direct it in a cooling film along inner surfaces of the liner segments. The cooling film is effective for reducing the temperatures experienced by the liner segments.

However, during operation combustors typically experience variations in temperature throughout the different structural portions thereof. For example, the liner segments, which are heated by the combustion gases, experience higher temperatures than the cooling nuggets, which are cooled by the compressor discharge air. Inasmuch as combustor materials expand when heated, variations in temperature of these combustor portions result in differential thermal expansion of these portions, or an attempt to expand differentially where restrained from doing so, which induces thermal stresses and distortions.

More particularly, the hot liner segments tend to expand more than the cooling nuggets. However, the liner segments are attached to the nuggets and both oppose this differential thermal growth, resulting in thermally induced stress. The magnitude of the thermal stress and the number of cycles thereof is reflected in the thermal fatigue life of the material. The more cycles and the higher the thermal stress, the sooner a combustor component must be replaced prior to reaching the limit of its thermal fatigue life.

Furthermore, thermally induced distortions can be significant where they cause a typical overhanging lip adjacent to conventional cooling nuggets to grow radially outwardly and partially close off film cooling slots in the combustor. In this situation, means are typically provided for reducing flow restriction of the cooling slot.

Examples of conventional combustors including cooling nuggets and overhanging lips are disclosed in U.S. Pat. No. 4,259,842-Koshoffer et al, U.S. Pat. No. 4,050,241-DuBell, U.S. Pat. No. 3,995,422-Stamm, and U.S. Pat. No. 3,845,620-Kenworthy, all assigned to the assignee of the present invention and incorporated herein by reference. These patents also disclose the combustor environment, including hot gases and cooling air, and a few arrangements for reducing cooling slot flow restriction caused by differential thermal growth which may exist. However, in all these combustor arrangements, differential thermal expansion still produces significant thermal stress.

Accordingly, it is an object of the present invention to provide a new and improved combustor liner.

Another object of the present invention is to provide a new and improved combustor liner that is effective for reducing thermal stress due to differential thermal expansion.

Another object of the present invention is to provide a new and improved combustor liner that is effective for reducing thermal distortion due to differential thermal expansion.

SUMMARY OF THE INVENTION

A combustor liner for use between a cooling fluid and hot combustion gases is disclosed. The combustor liner includes adjacent portions having different thermal coefficients of expansion effective for reducing stresses due to differential thermal expansion tendency of the adjacent portions. In one embodiment, portions subject to relatively high temperatures have relatively low coefficients of expansion and portions subject to relatively low temperatures have relatively high coefficients of expansion. In this manner, differential thermal expansion is reduced, thereby reducing thermally induced stress and distortion.

BRIEF DESCRIPTION OF THE DRAWINGS

The invention, together with further objects and advantages thereof, is more particularly described in the following detailed description taken in conjunction with the accompanying drawings in which.

DETAILED DESCRIPTION

Figure 1:
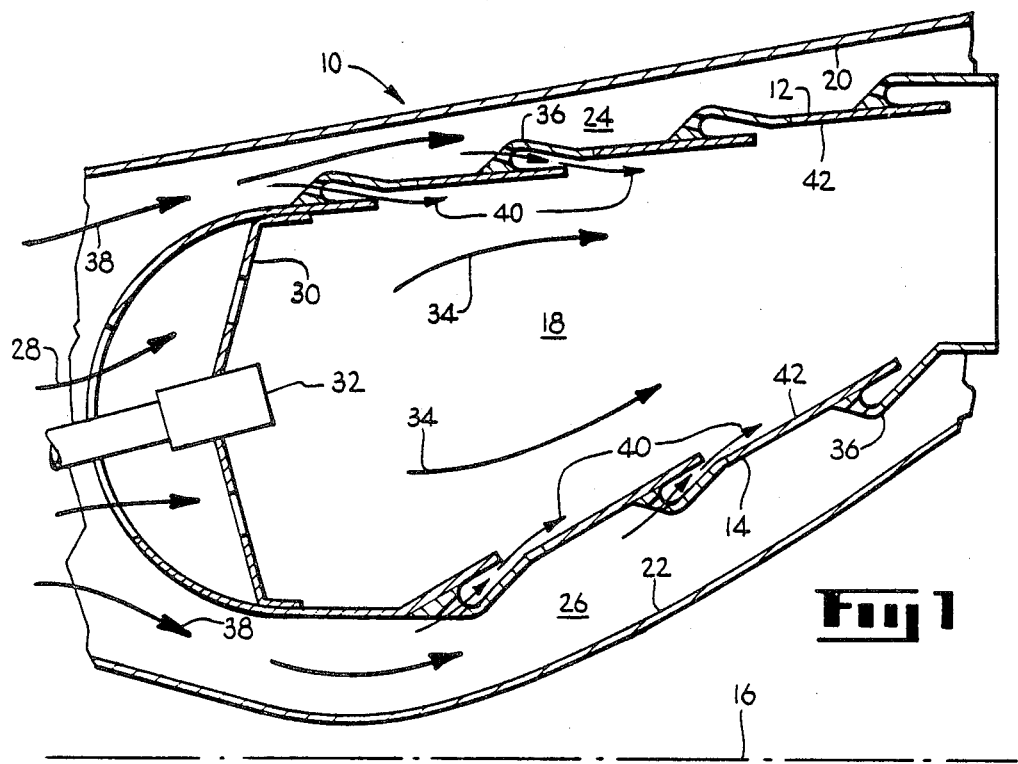
FIG. 1 is a sectional view of a combustor of a gas turbine engine according to one embodiment of the present invention.

Illustrated in FIG. 1 is an annular combustor 10 of a gas turbine engine according to one embodiment of the present invention. The combustor 10 includes an annular, radially outer combustor liner 12 and an annular, radially inner combustor liner 14 spaced therefrom. The liners 12 and 14 are disposed coaxially about an engine centerline 16 and define boundaries of a combustion chamber 18. An outer casing 20 and an inner casing 22 are spaced from the liners 12 and 14, respectively, and define an annular, outer cooling air duct 24 and an annular, inner cooling air duct 26.

Relatively cool, pressurized compressor discharge air 28 is provided from a compressor (not shown) to an upstream dome 30 of the combustor 10. Disposed in the dome 30 is a fuel nozzle 32 which supplies fuel to the combustion chamber 18 where it is mixed and ignited with the pressurized air 28 suitably channeled through the dome 30 for generating relatively hot, combustion gases 34. Additional compressor discharge air 28 is channeled to the combustion chamber 18 through dilution holes (not shown) included in the liners 12 and 14 for diluting the combustion gases 34.

In order to protect the outer and inner liners 12 and 14 from the relatively hot combustion gases 34, a plurality of annular cooling air nuggets 36 are provided in the liners 12 and 14. The nuggets 36 receive cooling air 38, which is a portion of the compressor discharge air 28, through the ducts 24 and 26. The nuggets 36 channel the cooling air 38 in a continuous annular cooling air film 40 along inner surfaces 42 of the combustor liners 12 and 14. The cooling air film 40 is effective for reducing the amount of heat transferred from the combustion gases 34 to the combustor liners 12 and 14, and, thusly, reduce the temperatures thereof which would otherwise exist.

Figure 2:
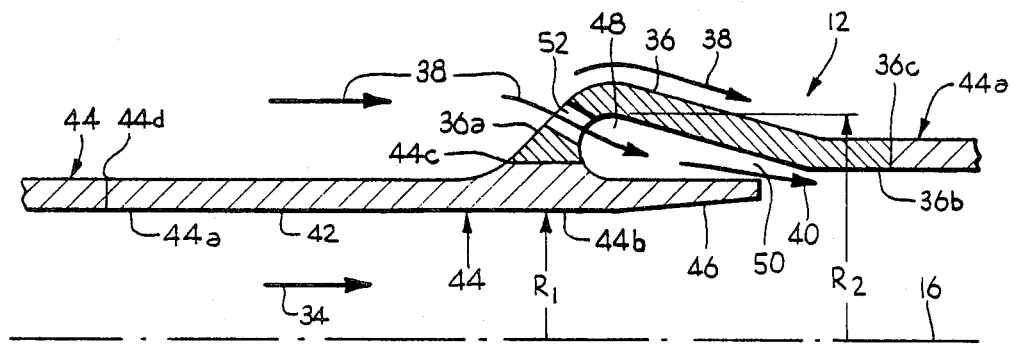
FIG. 2 is an enlarged sectional view of the combustor liner illustrated in FIG. 1.

Illustrated in more particularity in FIG. 2 is a portion of the combustor liner 12 according to one embodiment of the invention. The combustion liner 12 includes a plurality of annular liner segments 44 which are effective for providing a boundary to the hot combustion gases 34. The liner segments 44 are disposed adjacent to and joined by the nuggets 36. More specifically, an aft end region 44b of the liner segment 44 is suitably attached, by welding at 44c for example, to a forward end 36a of the nugget 36. An aft end 36b of the nugget 36 is suitably attached, by welding at 36c for example, to a forward end 44a of an adjacent liner segment 44. The nugget 36 cooperates with an aftmost, lip end 46 of the liner segment 44 for defining an annular cooling air plenum 48, which has a generally arcuate profile, and a film cooling slot or outlet aperture 50. The nugget 36 includes a plurality of inlet apertures 52 which are effective for receiving the cooling air 38 and providing the continuous, annular cooling film 40 through the film slot 50.

It is to be appreciated that inasmuch as the nuggets 36 receive and channel cooling air 38 without any direct exposure to the combustion gases 34, they operate at relatively lower temperatures than the liner segments 44 which directly face and confine the combustion gases 34. Accordingly, the liner segments 44 which experience temperatures relatively higher than those experienced by the nuggets 36, tend to thermally grow radially outwardly more than the nuggets 36 if made from the same material.

For example, illustrated in FIG. 2 is a liner segment having a nominal radius $R_1$ and a nugget 36 having a nominal radius $R_2$, both with respect to the engine centerline 16. Inasmuch as the liner segment 44 during engine operation is on the average hotter than the nugget 36, it will tend to expand more than the nugget 36. Accordingly, $R_1$ will tend to increase in magnitude greater than $R_2$ will, but is partially restrained to do so by the annular nugget 36. This differential thermal growth tendency between the liner segments 44 and the nuggets 36 induces thermal stress in the combustor liner 12. Furthermore, the lip 46, which also experiences relatively high temperatures, tends to grow radially outwardly, experiencing possible permanent distortion, and may reduce the thickness of the film slot 50.

However, in accordance with one embodiment of the present invention, it has been determined that these thermally induced stresses and differential displacements can be reduced by fabricating the relatively hot liner segment 44 from an alloy having a first thermal coefficient of linear expansion $C_1$ less than that of the relatively cool nugget 36. Conversely, the nugget 36 is fabricated from an alloy having a second thermal coefficient of linear expansion $C_2$ greater than the coefficient $C_1$. The thermal coefficient of linear expansion, e.g. $C_1$ and $C_2$, is defined as the increment of length in a unit of length for a rise in temperature of one degree.

By providing adjacent first and second portions, e.g. liner segment 44 and nugget 36, respectively, of the combustor liner 12 with predetermined, different thermal coefficients of expansion $C_1$ and $C_2$, respectively, the radial thermal expansion tendency of these portions can be made to be more nearly matched or equal. This is so because, unrestrained, radial thermal expansion is directly proportional to temperature change and the coefficient of expansion.

For example, if $T_1 \times C_1 = T_2 \times C_2$, where $T_1$ and $T_2$ indicate average temperature increases above cold, nonoperating temperature of adjacent portions having coefficients of expansion $C_1$ and $C_2$, respectively, then no differential thermal expansion, and thereby stress and distortion, would develop. Accordingly, by providing relatively hot and cold adjacent portions of the combustor liner 12 with relatively small and large coefficients of expansion, respectively, for more closely matching thermal expansion, the differential radial thermal growth of the liner segment 44 and the nugget 36 can be reduced, thereby reducing thermally induced stresses and distortions which might otherwise exist.

Although the liner segment 44 operates at average temperatures relatively higher than those of the nugget 36, the actual temperatures of the liner segment 44 and the nugget 36 vary continuously therethrough from a maximum at the inner surface 42 of the liner segment 44 to a minimum near the inlet apertures 52 of the nugget 36. In order to reduce the amount of stress that the weld locations 36c and 44c are subject to, these locations are preferably positioned in those portions of the liner 12 which experience a temperature about halfway between the maximum and minimum temperature thereof.

Of course, it is to be appreciated that the coefficients $C_1$ and $C_2$ are not constant in value but are dependent upon temperature. However, for the simple example described above, the coefficients $C_1$ and $C_2$ represent average values thereof for the expected range in operating temperature.

An example of a suitable alloy for the nugget 36 includes commercially available A286 having a thermal coefficient expansion $C_2$ having values between about $9.0 \times 10^{-6}$ per °F. ($5.0 \times 10^{-6}$ per °C.) at room temperature and about $10.0 \times 10^{-6}$ per °F. ($5.56 \times 10^{-6}$ per °C.) at 1200° F. (649° C.). A suitable alloy for the liner segment 44 includes commercially available Hastelloy X having a coefficient of expansion $C_1$ having values between about $7.7 \times 10^{-6}$ per °F. ($4.3 \times 10^{-6}$ per °C.) at room temperature and about $8.6 \times 10^{-6}$ per °F. ($4.8 \times 10^{-6}$ per °C.) at 1200° F. (649° C.).

Various alternative materials may also be selected for taking advantage of other material properties as appropriate in addition to the desired coefficients of expansion. For example, the ability to fabricate a combustor liner of several materials allows for the additional flexibility of using a material having improved performance in low temperature combustor portions which could otherwise not be used in a single material combustor because it would not be suitable for the high temperature combustor portions as well.

One method of fabricating a combustor liner, such as the liner 12 illustrated in FIG. 2, according to one embodiment of the present invention includes providing an annular liner segment 44 having a coefficient of expansion $C_1$. An annular nugget 36 having a second coefficient of expansion $C_2$ is also provided and is suitably joined, by welding at 44c for example, to the end region 44b of the liner segment 44 as illustrated in FIG. 2. A plurality of the nuggets 36 and the liner segments 44 can be suitably joined, for example by welding at 36c and 44d, for forming a complete combustor liner 12.

Another method for fabricating the combustor liners 12 or 14 in accordance with another embodiment of the invention is illustrated in FIGS. 3. In FIG. 3A a plurality of flat, first alloy strips 54 having the first coefficient of expansion $C_1$ and a flat, second alloy strip 56 having the second coefficient of expansion $C_2$ are provided. The second alloy strip 56 is joined to opposing lateral ends 54b and 54a of adjacent first alloy strips 54, such as, for example, by welding. A plurality of longitudinally spaced and aligned inlet apertures 58 can be suitably provided in the second alloy strip 56 as illustrated in FIG. 3A. The joined first and second alloy strips 54 and 56 are then formed into a ring 60 as illustrated in FIG. 3B.

Figure 3A:
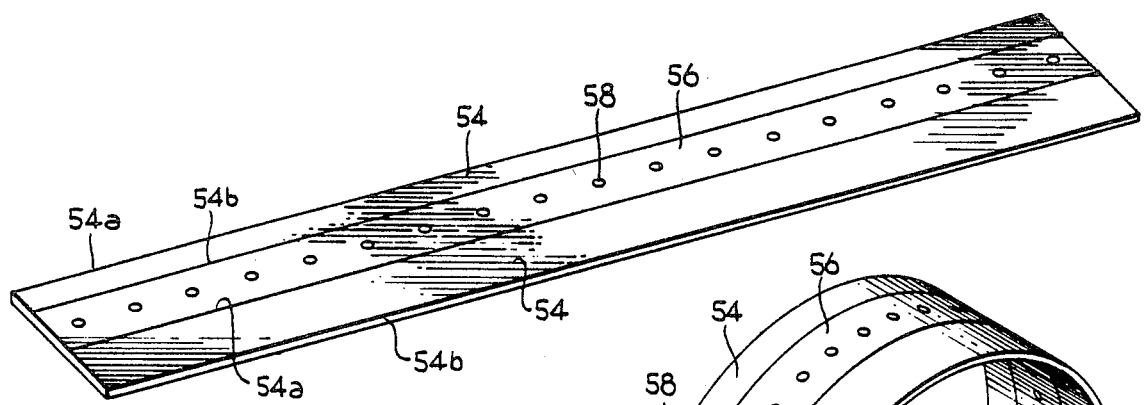
FIGS. 3A, 3B, 3C and 3D are a series of views illustrating a method of fabricating a combustor liner according to another embodiment of the invention.
Figure 3B:
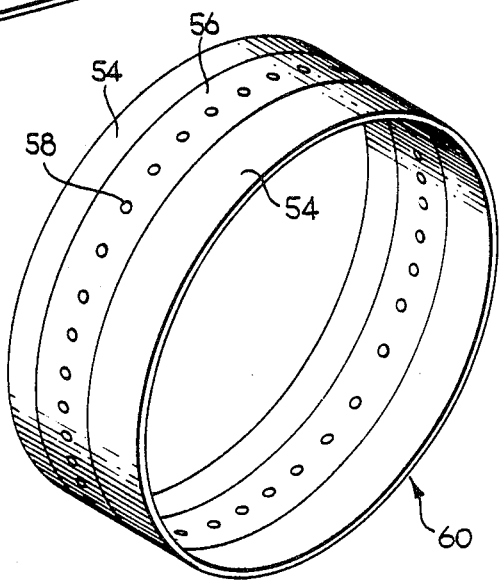
Figure 3C:
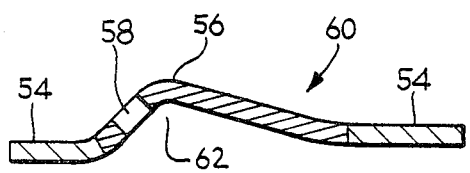

Illustrated in FIG. 3C is a cross section of the ring 60 formed in FIG. 3B further illustrating an additional step of forming the second alloy strip 56 for defining a plenum 62 having a generally arcuate profile.

Figure 3D:
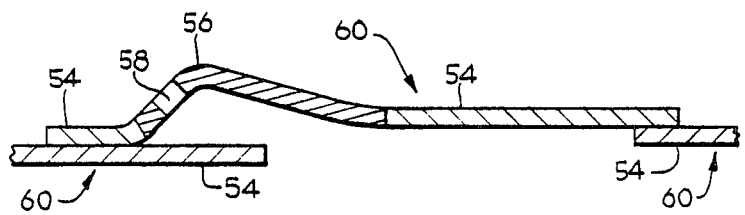

Finally, partially illustrated in FIG. 3D are several formed rings 60 suitably joined to each other, for example by brazing, for defining a portion of a completed combustor liner.

Figure 4:
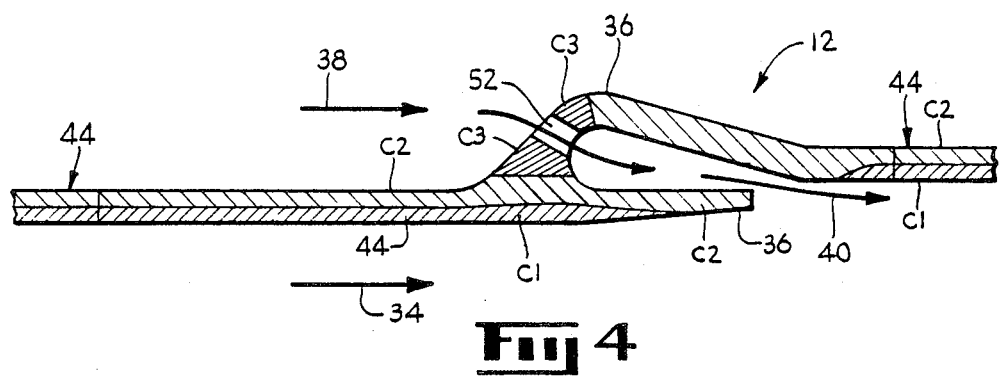
FIG. 4 is a sectional view of the combustor liner illustrated in FIG. 2 including materials having three different coefficients of thermal expansion.

Illustrated in FIG. 4, is another embodiment of the present invention including three different thermal coefficients of expansion $C_1$, $C_2$, and $C_3$. This Figure is intended to indicate that the distribution of temperatures during operation of the liner segments 44 and the nuggets 36 can be quite complex and includes many more different temperatures than the two average temperatures indicated for the liner 12 illustrated in FIG. 2. However, as above described, a liner 12 having only two different thermal coefficients of expansion, $C_1$ and $C_2$, for the liner segments 44 and nuggets 36 provides an improved structure.

Referring to FIG. 4, the coefficient $C_1$ is less than $C_2$ which in turn is less than $C_3$. This is intended to indicate that the average temperature of the combustor liner 12 is greater in those regions labeled $C_1$ than in those regions labeled $C_2$ and in turn in those regions labeled $C_3$. In many applications it may be desirable to provide a combustor liner having at least three and perhaps many more adjacent portions having different thermal coefficients of expansion matched with the different temperatures expected for these portions for reducing thermally induced stress and distortion in a manner as above described. The use of many different coefficients of expansion throughout the liner 12 also allows for compensation of differential thermal growth through the walls thereof, such as through the wall of the liner segment 44 including coefficients $C_1$ and $C_2$ as shown in FIG. 4. Optimally, a combustor liner having coefficients of expansion which vary continuously throughout the liner could be provided for effectively minimizing thermally induced stresses due to differential expansion.

Of course, it should be appreciated that the concept of substantially matching coefficients of expansion to expected temperatures of local portions is intended to illustrate the present invention in its simplest form. Actually, the combustor liners 12 and 14 are complex structures wherein thermally induced differential expansions produce relatively complex stress patterns. However, after having completed a detailed stress analysis and in view of the teachings herein, one skilled in the art can select appropriate coefficients of expansion and define more accurately the various regions of the combustor liners 12 and 14 for obtaining maximum reductions in thermally induced stress.

Inasmuch as the combustor liner 12 illustrated in FIG. 4 is more complex than the one illustrated in FIG. 2 suitable methods of fabrication are required. For example, the combustor liner 12 illustrated in FIG. 4 can be fabricated using Low Pressure Plasma Deposition (LPPD) techniques or powder metallurgy techniques known to those skilled in the art. These techniques allow for continuous variations in material properties throughout the combustor liners 12 and 14. Furthermore, these techniques allow for the selection of materials which might otherwise not be useable because not available in sheet form or as forgings or materials not having sufficient ductility or weldability.

Descriptions of an LPPD technique can be found in U.S. patent application Ser. No. 292,857, filed Aug. 14, 1981 entitled "Plasma Spray-Cast Components", incorporated herein by reference.

Figure 5:
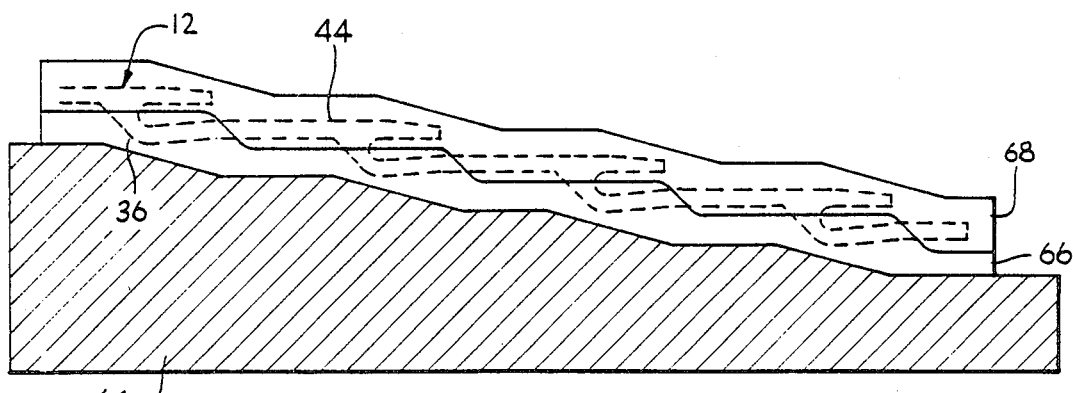
FIG. 5 is a sectional view illustrating the fabrication of a combustor liner using a Low Pressure Plasma Deposition technique.

Illustrated in FIG. 5 is an exemplary method of fabricating the combustor liner 12, shown in broken lines, using an LPPD technique. Simply described, a suitable annular mandrel 64 is provided. A first alloy 66, having a coefficient of expansion $C_1$, is then suitably sprayed over the mandrel 64. A second alloy 68, having a coefficient of expansion $C_2$, is then sprayed over the first alloy 66. The mandrel 64, and the first and second alloys 66 and 68 are predeterminedly shaped and applied, respectively, for obtaining a resultant combustor liner 12, which after machining will have a nugget 36 and a liner segment 44 such as illustrated in FIG. 2. Of course, a more complex liner, such as the one illustrated in FIG. 4 or one having continuously varying coefficients of expansion therethrough, could also be suitably fabricated using this technique with or without additional mandrel or mandrel portions as required.

Although the invention has been described for annular combustor liners, the invention can also be practiced for arcuate and flat liner portions defining any type of combustor. Furthermore, the invention can be practiced for any combustor liner having variously shaped liner segments and/or nuggets subject to differential thermal expansion.

While there have been described herein what are considered to be preferred embodiments of the present invention, other embodiments will occur to those skilled in the art from the teachings herein. Accordingly, having thus described the invention, what is desired to be secured by Letters Patent of the United States is:

I claim:

1. A combustor liner for use between a cooling fluid and hot combustion gases comprising adjacent portions having different thermal coefficients of expansion effective for reducing stress due to differential thermal expansion tendency of said adjacent portions.

2. A combustor liner according to claim 1 wherein said coefficients of expansion vary continuously throughout said liner.

3. A combustor liner according to claim 1 wherein said adjacent portions comprise first and second portions, said first portion being subject to experiencing higher temperatures than said second portion and having a thermal coefficient of expansion less than that of said second portion.

4. A combustor liner according to claim 3 wherein said first portion comprises a liner segment effective for providing a boundary to said hot combustion gases and said second portion comprises a nugget extending from an end region of said liner segment, said nugget including a plurality of inlet apertures for receiving said cooling fluid.

5. A combustor liner according to claim 4 wherein said end region of said liner segment includes an aftmost, lip end which cooperates with said nugget for defining a cooling air plenum having an outlet aperture for directing cooling air for film cooling a second liner segment extending from said nugget.

6. An annular combustor liner for use between a cooling fluid and combustion gases in a gas turbine engine comprising a plurality of coaxial annular liner segments effective for providing a boundary to said hot combustion gases and a plurality of annular nuggets joining adjacent liner segments, said nuggets including a plurality of inlet apertures and defining annular outlet apertures, said liner segments having a thermal coefficient of expansion less than that of said nuggets.

7. A combustor liner for use between a cooling fluid and hot combustion gases comprising portions having different thermal coefficients of expansion so that portions subject to relatively high temperatures have relatively low coefficients of expansion and portions subject to relatively low temperatures have relatively high coefficients of expansion.

8. A method of fabricating a combustor liner comprising:
   providing an annular liner segment having a first thermal coefficient of expansion;
   providing an annular nugget having a second thermal coefficient of expansion greater than that of said first coefficient of expansion; and
   joining said nugget to an end region of said liner segment.

9. A method of fabricating a combustor liner comprising:
   providing a plurality of first alloy strips having a first thermal coefficient of expansion;
   providing a second alloy strip having a second thermal coefficient of expansion greater than that of said first alloy strips;
   joining said second strip to opposing ends of adjacent ones of said first strips; and
   forming said joined first and second strips into a ring.

10. A method of fabricating a combustor liner according to claim 9 further including providing a plurality of inlet apertures in said second strip and forming said second strip into a nugget defining a plenum having a generally arcuate profile.

* * * * *